Jan. 22, 1957     A. G. CARTER     2,778,234
WHEEL ASSEMBLY
Filed Aug. 9, 1951
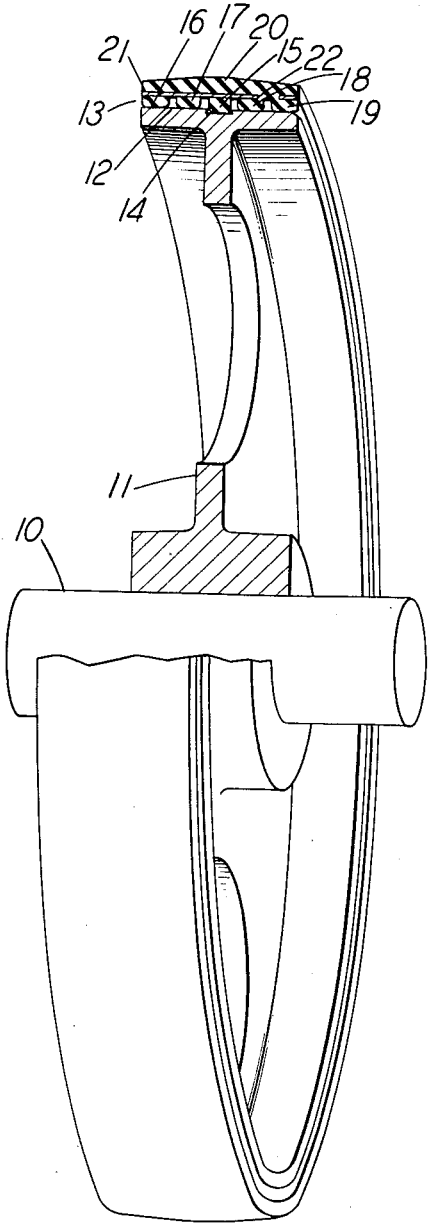
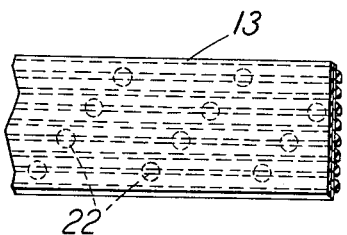
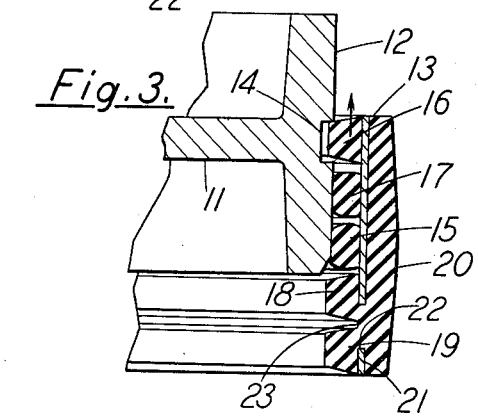
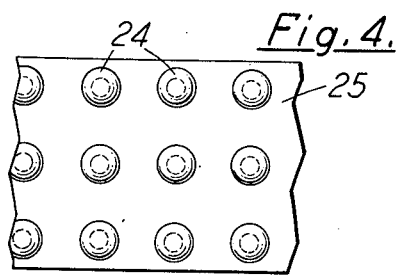
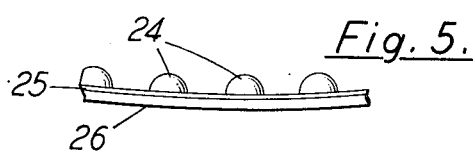
*Inventor*
*Andrew G. Carter*
-By-
*Attorney*

United States Patent Office 2,778,234
Patented Jan. 22, 1957

2,778,234

WHEEL ASSEMBLY

Andrew G. Carter, Grand Rapids, Mich., assignor to Carter Products Company, Inc., Grand Rapids, Mich., a corporation of Michigan Application August 9, 1951, Serial No. 241,108

4 Claims. (Cl. 74—230.7)

The present invention provides an improved system for attaching resilient tire members to the periphery of a wheel. The principal field of utility of this development is in connection with band saws, in which a metal wheel is provided with a surface of rubber adapted to carry a flexible saw blade under the necessary tension without injury to the teeth. This invention is associated with the particular type of tire member which involves a substantially cylindrical annular metal core adapted to carry circumferential tension. Resiliant material is bonded to this core member to provide the actual running surface, but the tension of the core member holds the resilient material firmly in position on the wheel. My previously-filed patent application Serial Number 26,787 (filed on May 13, 1948), now Patent No. 2,673,469, dated March 30, 1954, and application Serial Number 153,456 (filed by me and Jay A. Caswell on April 1, 1950), now Patent No. 2,701,971, dated February 15, 1955, relate to tire members of this general category. The present invention is primarily concerned with the formation of the pads that are disposed between the core member and the surface of the metal wheel, and with certain modifications of the core member itself which are related to the position of the pads.

The supporting pads provided by the present invention are preferably annular in form and are spaced one from another. This spacing is preferably complete, and results in exposing the material of the core between the pads so that the pads may be isolated one from another. These features are of exceptional value in the manufacture and in the installation of the tire units. The exposure of the core member along an annular surface makes possible the manufacture of the tire member in a mold in which the core may be uniformly supported around its entire circumference, the mold actually bearing on the core member at the areas between the supporting pads. This uniform support of the core member within the mold results in a much more uniform distribution of resilient material around the core over the entire tire. When a core is supported at isolated points rather than uniformly around its circumference, there is a tendency for the flexible core member to develop sections of non-uniform curvature. With the cavity provided for the molding of the resilient material being uniformly annular, it follows that a core member which is not properly supported will tend to weave its way in a serpentine fashion through the mold cavity. Unevenness of distribution of the resilient material due to the serpentine positioning of the core member results in varying the amount of resilient material on the inside of the core, and the effect of a given amount of circumferential tension will cause a greater displacement of resilient material at one point on the wheel than at other points, and a generally eccentric relationship will result.

The isolated relationship of the pads mentioned above has another very valuable result, which is independent of the molding process. With spacing provided between the pads (regardless of whether such spacing extends entirely to the core) the forced engagement of the tire on the wheel will result in lateral displacement (in a direction parallel to the axis of the wheel) of the material of the pads. The inside diameter of the entire tire measured at the pads is sufficiently less than the outside diameter of the metal wheel frame that the forced fit referred to above necessarily results. When the tire member is in position, it may be said to be supported by the balanced pressure on the various parts of the pads on every side of the wheel. The spacing between the pads permits this axial displacement to take place without developing what amounts to a fluid pressure. This feature permits a great deal more dimensional displacement in a radial direction for a given amount of circumferential tension, and thereby makes it easier to properly maintain the position of the tire member without unduly complicating the installation of the tire.

The presence of the spaces between the annular pad members makes possible a further development in molding technique which will tend to improve distribution of resilient material about the core member. It is practically impossible, in the molding process of the tire, to place exactly the correct amount of raw material about the core member so that a perfect distribution results. As a consequence, it is highly desirable that a certain amount of flow be permitted to take place between the material on the outside of the core member and that on the inside. For this purpose, a series of relatively small holes is provided in the core member spaced frequently enough to permit a small amount of flow to take place during the curing operation. If these holes were placed directly opposite the heaviest portion of the annular pads, the pressure on the pads developed during the installation of the tire would have a tendency to force resilient material back through the holes and develop a bump on the outside surface of the tire. Such a local deformation is extremely undesirable due to the effects it has upon the ability of the tire to carry the saw blade without vibration and without inducing unnecessarily sharp curvature. By spacing these so-called "flow holes" opposite the spaces between the pads, the tendency of the resilient material to flow back through the holes during the installation of the tire is removed. This tendency is even removed in cases in which the spacing does not extend completely to the core member. Where the spacing does extend completely to the core member, it is preferable that the flow holes be of a diameter somewhat larger than the exposed area of the core so that the material on the outside of the core member can communicate with the recesses in which the pads are molded without complete interference from the presence of the mold.

While, as indicated above, the annular arrangement of pads is the preferred form of the present invention, several of the advantages outlined above can be obtained through the use of a series of relatively isolated buttons. It is of course preferred that these buttons be spaced in such a manner as to provide an annular support for the core member. If the buttons are sufficiently numerous, however, the very number of supporting points provided between them will amount to a substantially annular support of the core.

The several features of the present invention will be analyzed in detail through a discussion of the particular embodiments illustrated in the accompanying drawings. In these drawings:

Figure 1 is a perspective view of a wheel assembly involving a metal wheel frame and a resilient tire member, with a portion of the assembly broken away to show the details of construction.

Figure 2 is a view of a portion of a tire member constructed according to the present invention, the view being taken in perspective and showing the relationship of the flow holes and the pad arrangement.

Figure 3 is a section on a somewhat enlarged scale of the wheel frame and a tire unit approximately half-way through the process of assembly.

Figures 4 and 5 (which are in projection) illustrate a modified form of the present invention from that shown in Figures 1 to 3, and involving a series of resilient buttons in place of the annular pads.

Referring to Figure 1, a wheel assembly is shown supported upon a shaft 10, the assembly consisting of the metal wheel frame 11 provided with the outer peripheral surface 12. A tire member indicated generally at 13 has been forced into position upon the outer surface 12, and the central groove 14 in the peripheral surface is engaged by the central supporting pad 15. This arrangement serves to lock the tire against axial displacement. The process of inserting the tire on the wheel compresses the central pad 15, which then expands into engagement with the groove 14 when the tire reaches the position shown in Figure 1 relative to the frame 11. The tire member 13 is also provided with the annular pads 16, 17, 18, and 19. A quantity of resilient material 20 is bonded to the outer surface of the core member 21 to provide the running surface for a saw blade.

Referring to Figure 3, the tire unit 13 is shown being installed on the surface 12 in the direction of the arrow. The pads 15 and 17 are shown in a compressed condition, while the pads 18 and 19 are shown free. It will be noted that the height of the pads (the radial thickness) is uniform in the free condition so as to assure uniform positioning of the tire. Pad 16 is shown in Figure 3 in the free condition due to the fact that it happened at that moment to be opposite the groove 14, and it accordingly expanded into that area. It will again be compressed as the tire member passes into the relative position with the frame shown in Figure 1. It is preferable that the central pad 15 have a somewhat greater height than the other pads due to the fact that it is used as a means of locking the tire through engagement with the groove 14.

Examination of Figure 3 will indicate the utility of the spaces between the pads during the installation process. The pads 15 and 17, compressed by the presence of the outer surface 12, have expanded in a direction parallel to the axis of the wheel. The space between these pads is sufficient to permit such expansion, preferably without having one pad bear against the other. This arrangement permits a considerable amount of deformation without building up excessive pressures which would complicate the installation of the tire.

In Figure 3, the flow hole 22 is shown positioned directly opposite the space 23 between the pads 18 and 19. During the molding process in which the tire is formed, this hole permits flow from the outer area 20 either to or from the cavities which form the pad 18 or 19. It will also be noted that the deformation of the pads 18 and 19 during the process of the installation of the tire will not result in forcing a substantial quantity of resilient material back through the hole 22 due to the remoteness of this hole from the area of high pressure at the central portion of the pads.

Referring to Figures 4 and 5, the modified construction of the pads provides a series of buttons 24 of resilient material formed on the inner side of the core member 25. The spaces between these buttons permit displacement of material to take place in any direction over the surface of the wheel frame during the installation process. It is preferable that the buttons be disposed in an arrangement which will permit a continuous annular support of the core member in the mold. When the modification shown in Figures 4 and 5 is installed on a wheel, the uniform support provided by the large number of buttons 24 results in accurately positioning the exterior running surface 26 in much the same fashion as is characteristic of the arrangements shown in Figures 1 to 3, inclusive. In connection with the installation of any of these tires, it is preferable that the tire be lubricated with a soap solution to minimize the frictional resistance of the pads against the surface 12. It will be noted that the modification of Figures 4 and 5 provides a series of centrally-located projections adapted to engage a groove similar to the groove 14 of Figure 1.

The particular modifications of the present invention that have been illustrated in the accompanying drawings and discussed herein are for illustrative purposes only and are not to be considered as a limitation upon the scope of the appended claims. In these claims it is my intention to claim the entire invention except as I am limited by the prior art.

I claim:

1. A wheel assembly comprising a rim having a substantially cylindrical periphery provided with an intermediate annular grove, a tire embracing said rim on both sides of said groove and having a substantially cylindrical circumferentially stressed relatively inextensible core member, cover material secured to the outer surface of said core member, a plurality of resilient axially spaced deformable pads of substantially uniform height secured to the inner surface of said core member and engaging substantially cylindrical portions of said periphery on both sides of said groove, the height of said pads establishing an inner diameter slightly less than the outer diameter of said cylindrical periphery before application of said tire thereto, and annularly disposed resilient engaging means secured to the inner surface of said core member and projecting into said groove.

2. A wheel assembly comprising a rim, a tire embracing said rim, said tire containing substantially cylindrical circumferentially stressed core means having holes therein, cover material secured to the outer surface of said core means, and a plurality of isolated axially spaced and substantially annularly disposed deformable pads formed of resilient material secured to the inside surface of said core means, said core means having exposed portions intermediate said pads, said holes being disposed radially opposite spaces between said pads and of a diameter greater than the width of the exposed portions of said core means between said axially spaced pads.

3. A wheel assembly comprising a rim having a periphery providing a cylindrical surface containing an annular groove, a tire embracing said rim, said tire containing substantially cylindrical circumferentially stressed core means, cover material secured to the outer surface of said core means, deformable pad means secured to the inner surface of said core means and deformed against said cylindrical surface, and substantially annular engaging means of smaller internal diameter than said pad means formed of deformable resilient material secured to the inner surface of said core means, said engaging means penetrating said groove and being axially spaced from said pad means.

4. A wheel assembly comprising a rim having a peripheral cylindrical surface extending to at least one axial edge thereof, a unitary tire embracing said rim, said tire containing substantially cylindrical circumferentially stressed core means of substantially inextensible material, resilient cover material secured to and completely covering the outer surface of said core means, and a plurality of mutually isolated axially spaced and substantially annularly arranged deformable pads formed of resilient material projecting from the inner surface of said core means frictionally engaging and deformed against said cylindrical surface whereby said tire is slidably mounted on said rim.

References Cited in the file of this patent

UNITED STATES PATENTS

| | | |
|---|---|---|
| 300,782 | Koch | June 24, 1884 |
| 705,072 | Grant | July 22, 1902 |
| 1,025,108 | Biggar | Apr. 30, 1912 |
| 1,456,458 | Nordell | May 22, 1923 |
| 1,576,924 | Malloy | Mar. 16, 1926 |
| 1,765,402 | Carter | June 24, 1930 |
| 1,838,164 | Tannewitz | Dec. 29, 1931 |
| 1,907,345 | Cornish | May 2, 1933 |
| 2,369,635 | Bacon | Feb. 20, 1945 |

FOREIGN PATENTS

| | | |
|---|---|---|
| 11,406 | Great Britain | June 1, 1899 |